United States Patent
Bulat et al.

(10) Patent No.: US 10,941,940 B2
(45) Date of Patent: Mar. 9, 2021

(54) BURNER FOR A GAS TURBINE AND METHOD FOR OPERATING THE BURNER

(71) Applicant: Siemens Aktiengesellschaft, Munich (DE)

(72) Inventors: Ghenadie Bulat, Lincoln (GB); Jonathan May, Lincoln (GB)

(73) Assignee: SIEMENS ENERGY GLOBAL GMBH & CO. KG, Munich (DE)

(*) Notice: Subject to any disclaimer, the term of this patent is extended or adjusted under 35 U.S.C. 154(b) by 231 days.

(21) Appl. No.: 15/739,286

(22) PCT Filed: Jul. 4, 2016

(86) PCT No.: PCT/EP2016/065712
§ 371 (c)(1),
(2) Date: Dec. 22, 2017

(87) PCT Pub. No.: WO2017/005694
PCT Pub. Date: Jan. 12, 2017

(65) Prior Publication Data
US 2018/0172277 A1    Jun. 21, 2018

(30) Foreign Application Priority Data
Jul. 6, 2015 (EP) .................................... 15175472

(51) Int. Cl.
*F23R 3/28* (2006.01)
*F23R 3/14* (2006.01)
(Continued)

(52) U.S. Cl.
CPC ................ *F23R 3/286* (2013.01); *F02C 3/22* (2013.01); *F23R 3/14* (2013.01); *F23R 3/36* (2013.01);
(Continued)

(58) Field of Classification Search
CPC .. F23R 3/36; F23R 3/286; F23R 2900/00002; F23R 2900/00013; F23R 2900/00014;
(Continued)

(56) References Cited

U.S. PATENT DOCUMENTS 8,302,404 B2* 11/2012 Nilsson .................... F23D 14/70
60/748
9,400,113 B2* 7/2016 Ogata ....................... F23R 3/34
(Continued)

FOREIGN PATENT DOCUMENTS

CN    101526217 A    9/2009
CN    101713546 A    5/2010
(Continued)

OTHER PUBLICATIONS

International Search Report dated Oct. 7, 2016, for PCT/EP2016/065712.
(Continued)

*Primary Examiner* — Todd E Manahan
*Assistant Examiner* — Thuyhang N Nguyen

(57) ABSTRACT

A burner for a gas turbine, having a combustion chamber, a first injector adapted to inject a first fuel into the combustion chamber and a second injector adapted to inject a second fuel being less reactive than the first fuel into the combustion chamber, wherein the burner is adapted to premix the fuels with an air flow before the fuel enter the reaction zone of the combustion chamber such that a first fuel flow of the first fuel has a first premixing stream line and a second fuel flow of the second fuel has a second premixing stream line, wherein each of the premixing stream lines begins with the beginning of the premixing with the air flow and ends at the location where the fuel enters the reaction zone and the length of the second premixing stream line is longer than the length of the first premixing stream line.

16 Claims, 2 Drawing Sheets

(51) Int. Cl.
*F23R 3/36* (2006.01)
*F02C 3/22* (2006.01)
(52) U.S. Cl.
CPC ...... *F05D 2220/32* (2013.01); *F05D 2240/35* (2013.01); *F23C 2900/9901* (2013.01); *F23C 2900/99011* (2013.01); *F23R 2900/00002* (2013.01); *F23R 2900/00013* (2013.01)
(58) Field of Classification Search
CPC .... F23R 3/283; F02C 9/28; F02C 9/26; F02C 3/22; F23C 2900/99011
See application file for complete search history.

(56) References Cited

U.S. PATENT DOCUMENTS

| | | | |
|---|---|---|---|
| 2003/0056517 A1 | 3/2003 | Brushwood et al. | |
| 2004/0226297 A1 | 11/2004 | Griffin et al. | |
| 2009/0301096 A1 | 12/2009 | Remy et al. | |
| 2010/0300108 A1* | 12/2010 | Demougeot | F02C 7/228 60/773 |
| 2011/0100018 A1* | 5/2011 | Nakamura | F02C 3/24 60/776 |
| 2012/0247119 A1* | 10/2012 | Williams | F02C 9/28 60/773 |
| 2015/0362194 A1 | 12/2015 | Ogata et al. | |

FOREIGN PATENT DOCUMENTS

| | | | |
|---|---|---|---|
| EP | 1568942 A1 | 8/2005 | |
| EP | 2317098 A1 | 5/2011 | |
| EP | 2378203 A2 | 10/2011 | |
| EP | 2472179 A1 * | 7/2012 | ............... F23R 3/14 |
| EP | 2472179 A1 | 7/2012 | |
| WO | WO-2013120558 A1 * | 8/2013 | ............... F02C 7/22 |
| WO | 2015037295 A1 | 3/2015 | |

OTHER PUBLICATIONS

EP Search Report dated Dec. 21, 2015, for EP patent application No. 15175472.8.

* cited by examiner

BURNER FOR A GAS TURBINE AND METHOD FOR OPERATING THE BURNER

CROSS REFERENCE TO RELATED APPLICATIONS

This application is the US National Stage of International Application No. PCT/EP2016/065712 filed Jul. 4, 2016, and claims the benefit thereof. The International Application claims the benefit of European Application No. EP15175472 filed Jul. 6, 2015. All of the applications are incorporated by reference herein in their entirety.

FIELD OF INVENTION

The invention relates to a burner for a gas turbine and a method for operating the burner.

BACKGROUND OF INVENTION

A burner is conventionally designed for a specific fuel, for example natural gas, diesel, syngas or landfill gas. However, when the burner that was designed for one fuel is operated with a different fuel, then the operation of the burner will not be optimal. The operation with the different fuel can result in a flashback that can lead to a flame burning on the burner surface, a flameout, combustion dynamics that effect the integrity of the burner, a high pressure drop that leads to a performance loss, or high emissions, for example high emissions of $NO_x$.

In addition to conventional hydrocarbon fuels, synthetic fuels like hydrogen can be used in the burner. The combustion of the synthetic fuels differ from the combustion of conventional fluids in particular in respect to diffusivity, caloric value, ignition temperatures and flame speeds. For example, the combustion of hydrogen with air occurs at higher flame speeds than the combustion of natural gas with air. Therefore, in case that hydrogen is used in a burner that is designed for natural gas, this can result in a flashback.

SUMMARY OF INVENTION

It is an object of the invention to provide a burner and a method for operating the burner, wherein the burner can be operated with different fuels with good combustion properties.

The burner according to the invention for a gas turbine comprises a combustion chamber, a first injector adapted to inject a first fuel into the combustion chamber and a second injector adapted to inject a second fuel being less reactive than the first fuel into the combustion chamber, wherein the burner is adapted to premix the fuel with an air flow before the fuel enter the reaction zone of the combustion chamber such that a first fuel flow of the first fuel has a first premixing stream line and a second fuel flow of the second fuel has a second premixing stream line, wherein each of the premixing stream lines begin at the fuel injection into the air flow and end at the location where the fuel enters the reaction zone and the length of the second premixing stream line is longer than the length of the first premixing stream line.

The method according to the invention for operating a burner for a gas turbine, wherein the burner comprises a combustion chamber, a first injector adapted to inject a first fuel into the combustion chamber and a second injector adapted to inject a second fuel being less reactive than the first fuel into the combustion chamber, wherein the burner is adapted to premix the fuels with an air flow before the fuel enter the reaction zone of the combustion chamber such that a first fuel flow of the first fuel has a first premixing stream line and a second fuel flow of the second fuel has a second premixing stream line, wherein each of the premixing stream lines begins with the beginning of the premixing with the air flow and ends at the location where the fuel enters the reaction zone and the length of the second premixing stream line is longer than the length of the first premixing stream line, comprises the step: —injecting at least one of these fuel into the combustion chamber.

With the burner and the method for operating the burner according to the invention it is advantageously achieved that the best premixing of each fuel stream with air can be achieved. Therefore, a single and correct location for the reaction zone can be achieved which results in a stable flame that is tolerant to load changes or changes of the ratio of the first fuel and second fuel. Furthermore, because of the good premixing of each fuel low emissions, in particular of $NO_x$, can be achieved.

It is conceivable that the first fuel is hydrogen and the second fuel is natural gas. Alternatively, it is conceivable that the first fuel is hydrogen and the second fuel is ammonia gas. It is also conceivable that the first fuel is natural gas and that the second fuel is ammonia gas. The first fuel increases the flame stability. The first fuel also enables the combustion of the low reactive ammonia gas.

It is advantageous that the first injector and the second injector are located such that the first fuel is injected into the air flow downstream in respect to the direction of the air flow from where the second fuel is injected into the air flow, so that the length of the second premixing stream line is longer than the length of the first premixing stream line. This provides an easy way to ensure the different lengths of the premixing stream lines.

The burner advantageously comprises a third injector adapted to inject a third fuel being less reactive than the second fuel into the combustion chamber, wherein a third fuel flow of the third fuel has a third premixing stream line with a length that is longer than the length of the second premixing stream line. This allows advantageously the combustion of three different fuels, hence increasing the flexibility of the burner. It is advantageous that the third injector is located such that the third fuel is injected into the air flow upstream in respect to the direction of the air flow from where the second fuel is injected into the air flow, so that the length of the third premixing stream line is longer than the length of the second premixing stream line.

It is advantageous that the first fuel is hydrogen, the second fuel is natural gas and the third fuel is ammonia gas. Here, the hydrogen serves mainly for flame stabilisation. The natural gas serves as a backup for the case when no hydrogen is available. The ammonia gas provides most of the power output. The third premixing fuel stream line is the longest of the three premixing stream lines, hence advantageously compensating for the low diffusivity of the ammonia gas.

It is advantageous that the length of the first premixing stream line is from 20 mm to 150 mm, in particular from 40 mm to 60 mm, the length of the second premixing stream line is from 40 mm to 300 mm, in particular from 80 mm to 120 mm, and the length of the third premixing stream line is from 60 mm to 400 mm, in particular from 125 mm to 175 mm. Here, the premixing stream lines are defined as a time average, hence compensating for fluctuations of the reaction zone. These lengths provide optimal premixing conditions for each of the fuels, in particular when hydrogen, natural gas and ammonia gas are used for first fuel, the second fuel and the third fuel, respectively.

It is advantageous that the burner comprises a third injector adapted to inject a third fuel being less reactive than the second fuel into the combustion chamber, wherein a third fuel flow of the third fuel has a third premixing stream line with a length that is longer than the length of the second premixing stream line and the method comprises the step: —injecting the third fuel and at least one of the first fuel and the second fuel into the combustion chamber during a base load operation of the gas turbine. The first fuel and/or second fuel advantageously serve to stabilise the combustion of the third fuel. During the base load operation the injected volume of the first fuel and the second fuel is advantageously up to 20 vol-% of the total fuel injected into the combustion chamber. Alternatively, it is advantageous that during the base load operation the injected volume of the third fuel is up to 95 vol-% of the total fuel injected into the combustion chamber. Under these conditions, a stable operation of the combustion is advantageously achieved.

It is advantageous that the burner comprises a third injector adapted to inject a third fuel being less reactive than the second fuel into the combustion chamber, wherein a third fuel flow of the third fuel has a third premixing stream line that is longer than the second premixing stream line and the method comprises the step: —injecting at least one of the first fuel and the second fuel and not the third fuel into the combustion chamber during an ignition process or a part load operation of the gas turbine. By operating the burner in this manner it is advantageously achieved that the ignition process is reliable and during part load operation a flameout is unlikely.

It is advantageous that the first fuel is hydrogen, the second fuel is natural gas and the third fuel is ammonia gas.

The method advantageously comprises following steps: (a) determining if a value of a temperature of a part of the burner to be protected from overheating has exceeded a predetermined maximum limit; (b) if so, changing at least one ratio of the fuel mass flows such as to reduce the value of the temperature below its predetermined maximum limit; if not, go to (c); (c) determining if a value of the amplitude of pressure variations within a combustion area of the burner has exceeded a predetermined maximum limit; (d) if so, changing said at least one ratio such as to reduce the value of the amplitude below its predetermined maximum limit; if not, go to (e); (e) repeat (a) to (d) such as to maintain the values of the temperature the amplitude below their respective predetermined maximum limits. By operating the burner in this manner it is advantageously achieved that the pressure oscillations within the combustion system are reduced and that the temperature of critical parts of the burner are reduced which results in a long life time of the burner.

BRIEF DESCRIPTION OF THE DRAWINGS

The above mentioned attributes and other features and advantages of this invention and the manner of attaining them will become more apparent and the invention itself will be better understood by reference to the following description of embodiments of the invention taken in conjunction with the accompanying drawings, wherein.

DETAILED DESCRIPTION OF INVENTION

Figure 1:
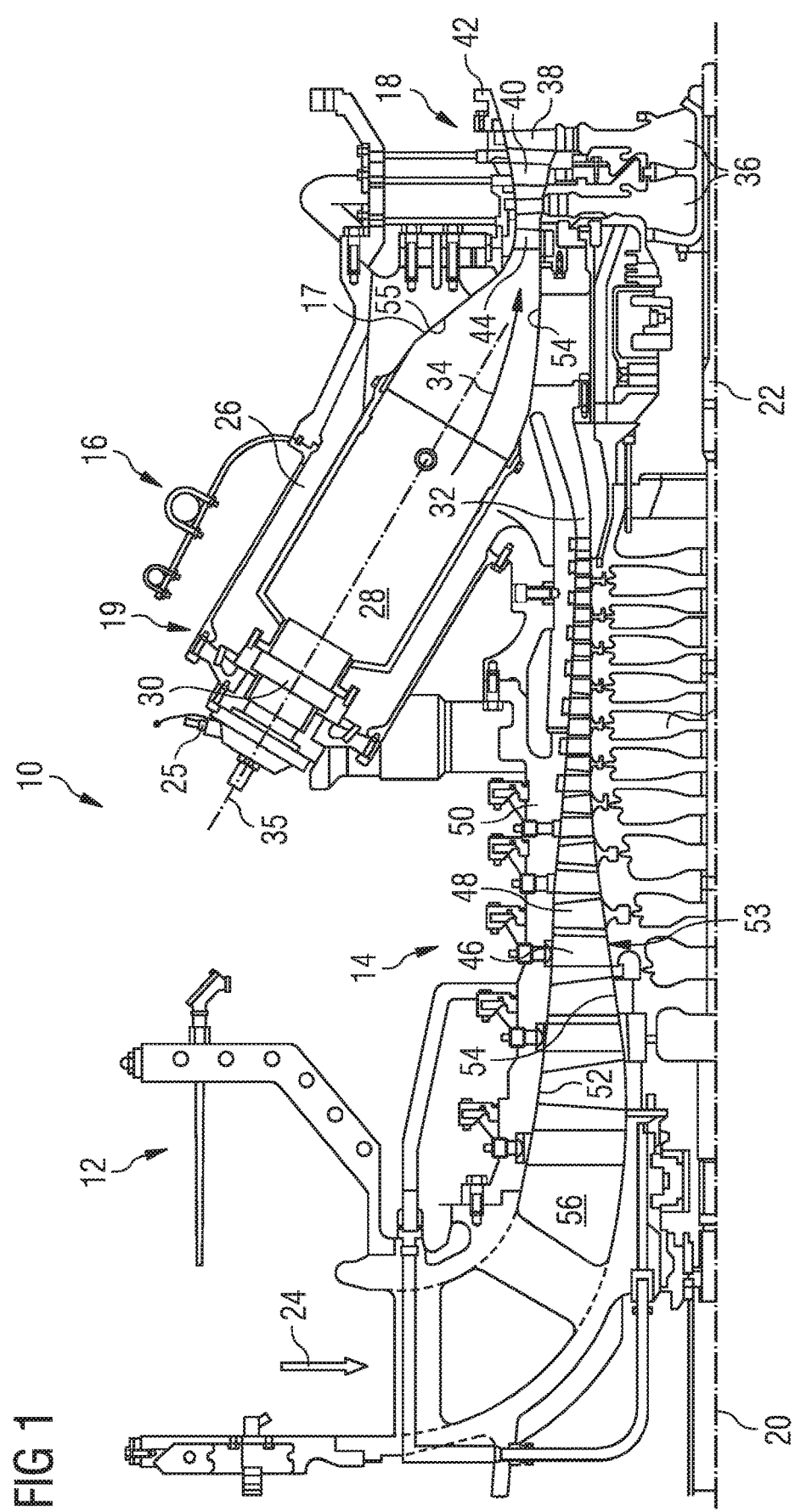
FIG. 1 shows part of a gas turbine in a sectional view and in which the present inventive burner is incorporated.

FIG. 1 shows an example of a gas turbine 10 in a sectional view. The gas turbine engine 10 comprises, in flow series, an inlet 12, a compressor section 14, a combustor section 16 and a turbine section 18 which are generally arranged in flow series and generally about and in the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channelled through the combustion chamber 28 to the turbine section 18 via a transition duct 17.

This exemplary gas turbine engine 10 has a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets form an annulus for channelling the combustion gases to the turbine 18.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

The turbine section 18 drives the compressor section 14. The compressor section 14 comprises an axial series of vane stages 46 and rotor blade stages 48. The rotor blade stages 48 comprise a rotor disc supporting an annular array of blades. The compressor section 14 also comprises a casing 50 that surrounds the rotor stages and supports the vane stages 48. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operations conditions.

The casing 50 defines a radially outer surface 52 of the passage 56 of the compressor 14. A radially inner surface 54 of the passage 56 is at least partly defined by a rotor drum 53 of the rotor which is partly defined by the annular array of blades 48.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications.

Figure 2:
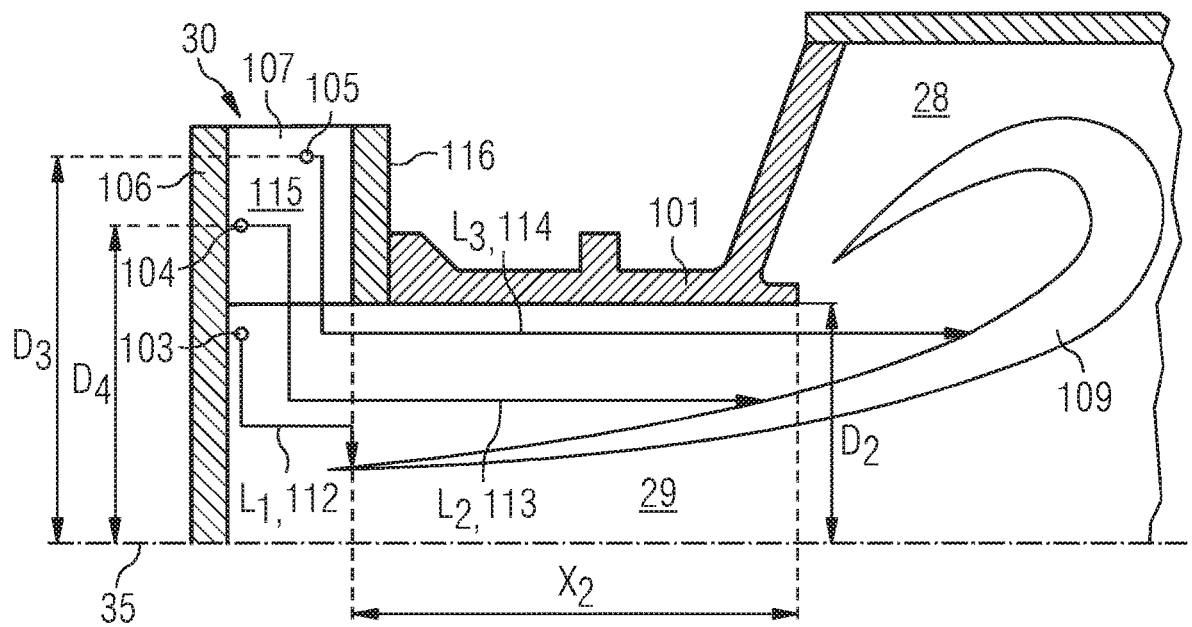
FIG. 2 shows a longitudinal section of the burner and FIG. 3 shows another longitudinal section of the burner.
Figure 3:
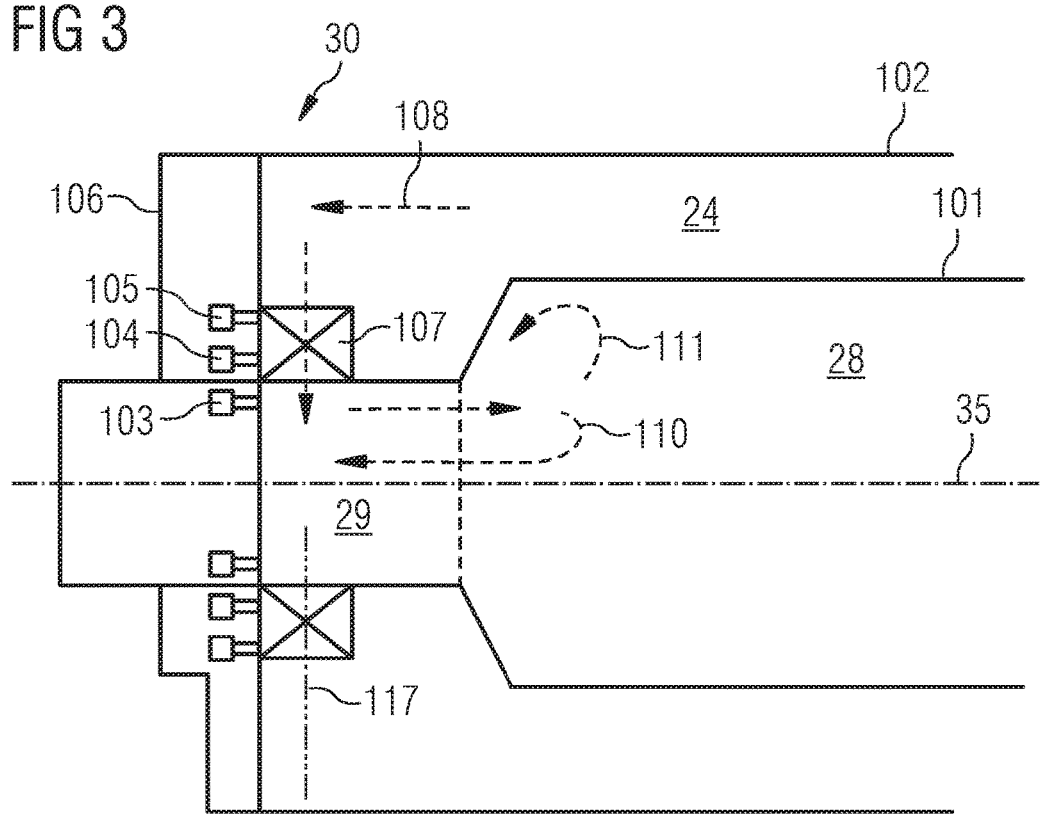

FIGS. 2 and 3 show that the burner 30 comprises an inner wall 101 that confines the combustion chamber 28 in a radial direction. Furthermore, the burner 30 comprises a burner plate 106 that confines that combustion chamber 28 in an axial direction. As it can be seen in FIG. 3, the burner 30 comprises an outer wall 102 that is arranged radially outside of the inner wall 101. The inner wall 101 and the outer wall 102 can be rotationally symmetric around a burner axis 35 of the burner. The air 24 is streamed in the space between the inner wall 101 and the outer wall 102 towards the burner plate 106 as indicated by arrows 108, so that the inner wall 101 is cooled and the air 24 is preheated before it enters the combustion chamber 28. The inner wall 101 can also be a double skin arrangement for cooling efficiencies.

The burner 30 comprises a swirler 107 located on the base plate 106 for swirling the air before it enters the combustion chamber 28. After passing the space between the inner wall 101 and the outer wall 102 the air 24 passes through the swirler 107 in a direction towards the burner axis 35 and enters the combustion chamber 28.

The burner 30 comprises a first injector 103 adapted to inject a first fuel into the combustion chamber 28, a second injector 104 adapted to inject a second fuel into the combustion chamber 28 and a third injector 105 adapted to inject a third fuel into the combustion chamber 28. The second fuel is less reactive than the first fuel and the third fuel is less reactive than the second fuel. This can be achieved for example, when the first fuel is hydrogen, the second fuel is natural gas and the third fuel is ammonia gas.

The burner 30 is adapted to premix these fuels with an air flow before the fuels enter a reaction zone 109 of the combustion chamber 28 such that a first fuel flow of the first fuel has a first premixing stream line 112, a second fuel flow of the second fuel has a second premixing stream line 113 and a third fuel flow of the third flow has a third premixing stream line 114. Each of the premixing stream lines at the fuel injection into the air flow and ends at the location where the fuel enters the reaction zone 109.

The injectors 103, 104 and 105 are arranged in the base plate 106, wherein the first injector 103 is located closer to the burner axis 35 than the second injector 104 and the second injector 104 is located closer to the burner axis 35 than the third injector 105. Therefore, the first fuel is injected into the air flow downstream in respect to the direction of the air flow from where the second fuel is injected into the air flow, so that the length $L_2$ of the second premixing stream line 113 is longer than the length $L_1$ of the first premixing stream line 112. Furthermore, the third injector 105 is located such that the third fuel is injected into the air flow upstream in respect to the direction of the air flow from where the second fuel is injected into the air flow, so that the length $L_3$ of the third premixing stream line 114 is longer than the length $L_2$ of the second premixing stream line 113.

The length $L_1$ of the first premixing stream line 112 is from 20 mm to 150 mm, in particular from 40 mm to 60 mm, the length $L_2$ of the second premixing stream line 113 is from 40 mm to 300 mm, in particular from 80 mm to 120 mm, and the length $L_3$ of the third premixing stream line 114 is from 60 mm to 400 mm, in particular from 125 mm to 175 mm.

In a relative and scalable definition of the present arrangement, the length L1 of the first premixing stream line 112 is between and including 0.25×D2 and 1×D2, the length L2 of the second premixing stream line 113 is between and including 0.5×D2 and 1.5×D2. The length L3 of the third premixing stream line 114 is between and including 1×D2 and 3×D2. The relationship between the premixing tube length (X2) and its radius (D2) is typically about 0.5 i.e D2=0.5×X2 and can be between 0.4 and 0.6×X2. For the present arrangement this relationship is without considering the swirler 107 height (axial extent).

The premixer tube or pre-chamber, defined by inner wall 101, is of a generally constant diameter D2. The pre-chamber, generally denoted by 29 in FIGS. 2 and 3, is located downstream of the swirler and upstream of the main combustion chamber 28. In normal operation the combustion flames are held within the combustion chamber 28. Mixing of air and fuels occur within the swirler 107 and pre-chamber 29. Slight variations in pre-chamber diameter are possible, but careful design is required to maintain the combustion flame within the combustion chamber 28 and downstream of the pre-chamber 29.

In an embodiment of the present burner, the first injectors 103 are located radially inwardly of the second injectors 104 and the third injectors 105 and the second injectors 104 are located radially inwardly of the third injectors 105. The first injector 103 and second injector 104 are located at least partly in the swirler vane 107 such that fuel is injected immediately away from the surface of the vane 107. Alternatively, the first injector 103 and/or second injector 104 can be located such that it extends through the burner plate 106 and effectively injects fuel immediately away from the base plate's surface, i.e. in an axial direction. In this embodiment, the third injector 105 is located further away from or axially away from the first injector 103 and second injector 104.

The first injector 103 is located radially inwardly of the swirler vane 107 so that the fuel is directed into the correct part of the airflow through the passageway. The location of the first, second and third injectors 103, 104 & 105 can be related to one another diameter ($D_2$). The first injector 103 is typically at $0.5 \times D_2 +/- 5\%$ of $D_2$. The first injector 103 is located a distance of the downstream edge of the swirler vane 107 within 5% of $D_2$. In one embodiment, second and third injectors 104, 105 are both located approximately the same radial distance $D_3 = 1.6 \times D_2$. In for other embodiments, second and third injectors 104, 105 have radial locations $D_3$ and $D_4$ respectively which can each be between $1.2 \times D_2$ and $3.0 \times D_2$. Where the third injector 105 injects an ammonia-based fuel, a relatively long radial length increases the time for mixing with the air flow and vaporisation.

Although only one injector orifice is shown on the Figures to represent each of the first, second and third injectors 103, 104 and 105 respectively, each injector may have more than one injector orifice. Any dimension or parameter given for its location is to the centre of the orifices or mid-point between orifices.

The annular array of swirler vanes 107, burner plate 106 and wall 116 define an annular array of passageways 115. These passageways 115 have a central axis 117 (see FIG. 3), which in the viewing-plane of FIGS. 2 and 3 is radially aligned. Nonetheless, angles from a radial line up to 15 degrees are possible in other embodiments. The swirler vanes 107 are also arranged such that the passageways 115 also have a tangential angle relative to the axis 35 as is know from the art. Thus this tangential angle creates the vortex of fuel and air about the axis 35.

It should be appreciated that the specific ranges of parameters set forth herein give rise to stable and efficient flames within the present burner arrangement. This is with particular respect to the types of fuels being burnt and their injection locations. Parameters outside those given herein result in relatively poor mixing of fuels and air and subsequent problems with efficiency, emissions and flame stability. The specified parameters ensure that fuels are correctly introduced into the air stream 108 passing through the swirler passages 115 such that each fuel type is burnt within the correct part of the flame 109.

It is conceivable that a multitude of first injectors 103 is arranged in the burner plate 106, each having the same distance to the burner axis 35. It is conceivable that a multitude of second injectors 104 is arranged in the burner plate 106, each having the same distance to the burner axis 35. It is conceivable that a multitude of third injectors 105 is arranged in the burner plate 106, each having the same distance to the burner axis 35.

The flame in the combustion chamber 28 has an inner recirculation zone 110 that stabilises the flame by transporting hot combustion products to the unburned air/fuel mixture, and an outer recirculation zone 111.

The burner can be operated during an ignition process or during a part load operation of the gas turbine 10 such that only the first fuel and/or second fuel is injected into the combustion chamber 28. During a base load operation of the gas turbine 10 the third fuel and at least one of the first fuel and second fuel is injected into the combustion chamber 28.

Furthermore, the burner 30 can be operated with an intelligent control of the fuel injection with the steps: (a) determining if a value of a temperature of a part of the burner 30 to be protected from overheating has exceeded a predetermined maximum limit; (b) if so, changing at least one ratio of the fuel mass flows such as to reduce the value of the temperature below its predetermined maximum limit; if not, go to (c); (c) determining if a value of the amplitude of pressure variations within a combustion area of the burner 30 has exceeded a predetermined maximum limit; (d) if so, changing said at least one ratio such as to reduce the value of the amplitude below its predetermined maximum limit; if not, go to (e); (e) repeat (a) to (d) such as to maintain the values of the temperature the amplitude below their respective predetermined maximum limits. It is conceivable to change said ratio in such a manner that the power output of the burner remains unchanged.

Although the invention is described in detail by the preferred embodiment, the invention is not constrained by the disclosed examples and other variations can be derived by the person skilled in the art, without leaving the extent of the protection of the invention.

The invention claimed is:

1. A burner for a gas turbine, wherein the burner comprises:
    a combustion chamber, a burner plate, an annular array of swirler vanes located on the burner plate, and a premixing tube between the annular array of swirler vanes and the combustion chamber,
    a first injector to inject a first fuel into the combustion chamber,
    a second injector to inject a second fuel being less reactive than the first fuel into the combustion chamber, and
    a third injector to inject a third fuel being less reactive than the second fuel into the combustion chamber,
    wherein the burner premixes the first fuel, the second fuel, and the third fuel with an air flow before the first fuel, the second fuel, and the third fuel enter a reaction zone of the combustion chamber such that a first fuel flow of the first fuel comprises a first premixing stream line, a second fuel flow of the second fuel comprises a second premixing stream line, and a third fuel flow of the third fuel comprises a third premixing stream line, and
    wherein each of the premixing stream lines begins with the beginning of premixing of a respective fuel with the air flow and ends at a location where the respective fuel enters the reaction zone,
    wherein a length (L2) of the second premixing stream line is longer than a length (L1) of the first premixing stream line, and a length (L3) of the third premixing stream line is longer than the length (L2) of the second premixing stream line,
    wherein between the annular array of swirler vanes and the combustion chamber the premixing tube comprises a premixing tube length (X2) in which a radius (D2) of the premixing tube remains constant;
    wherein the length (L1) of the first premixing stream line is between and including 0.25×D2 and 1×D2, the length (L2) of the second premixing stream line is between and including 0.5×D2 and 1.5×D2, and
    wherein a relationship between the premixing tube length (X2) and the radius (D2) is between D2=0.4×X2 and D2=0.6×X2.

2. The burner according to claim 1,
    wherein the first injector and the second injector are located such that the first fuel is injected into the air flow downstream in respect to a direction of the air flow from where the second fuel is injected into the air flow, so that the length (L2) of the second premixing stream line is longer than the length (L1) of the first premixing stream line.

3. The burner according to claim 1,
    wherein the third injector is located such that the third fuel is injected into the air flow upstream in respect to a direction of the air flow from where the second fuel is injected into the air flow, so that the length (L3) of the third premixing stream line is longer than the length (L2) of the second premixing stream line.

4. The burner according to claim 1,
    wherein the first fuel is hydrogen, the second fuel is natural gas and the third fuel is ammonia gas.

5. The burner according to claim 1,
    wherein the length (L1) of the first premixing stream line is from 20 mm to 150 mm, the length (L2) of the second premixing stream line is from 40 mm to 300 mm, and the length (L3) of the third premixing stream line is from 60 mm to 400 mm.

6. The burner according to claim 5,
    wherein the length (L1) of the first premixing stream line is from 40 mm to 60 mm, the length (L2) of the second premixing stream line is from 80 mm to 120 mm, and the length (L3) of the third premixing stream line is from 125 mm to 175 mm.

7. The burner according to claim 1,
    wherein the length (L3) of the third premixing stream line is between and including 1×D2 and 3×D2.

8. The burner according to claim 1, wherein the third injector is disposed in a swirler vane of the annular array of swirler vanes and farther from the burner plate than the first injector and the second injector.

9. The burner according to claim 8, wherein the second injector is disposed in the swirler vane.

10. A method for operating a burner for a gas turbine, wherein the burner comprises a combustion chamber, the method comprising:
   injecting a first fuel into the combustion chamber via a first injector,
   injecting a second fuel being less reactive than the first fuel into the combustion chamber via a second injector,
   injecting a third fuel being less reactive than the second fuel into the combustion chamber via a third injector, and
   premixing the first fuel, the second fuel, and the third fuel with an air flow before the first fuel, the second fuel, and the third fuel enter a reaction zone of the combustion chamber such that a first fuel flow of the first fuel comprises a first premixing stream line, a second fuel flow of the second fuel comprises a second premixing stream line, and a third fuel flow of the third fuel comprises a third premixing stream line,
   wherein each of the premixing stream lines begins with the beginning of the premixing of a respective fuel with the air flow and ends at a location where the respective fuel enters the reaction zone, and
   wherein a length (L2) of the second premixing stream line is longer than a length (L1) of the first premixing stream line, and a length (L3) of the third premixing stream line is longer than the length (L2) of the second premixing stream line.

11. The method according to claim 10, wherein the third fuel and at least one of the first fuel and the second fuel is injected into the combustion chamber during a base load operation of the gas turbine.

12. The method according to claim 10, wherein during a base load operation an injected volume of the first fuel and the second fuel is up to 20 vol-% of a total fuel injected into the combustion chamber.

13. The method according to claim 10, wherein during a base load operation an injected volume of the third fuel is up to 95 vol-% of a total fuel injected into the combustion chamber.

14. The method according to claim 10, wherein the third fuel is less reactive than the second fuel, and
   wherein at least one of the first fuel and the second fuel and not the third fuel is injected into the combustion chamber during an ignition process or a part load operation of the gas turbine.

15. The method according to claim 10, wherein the first fuel is hydrogen, the second fuel is natural gas and the third fuel is ammonia gas.

16. The method according to claim 10, further comprising:
   (a) determining if a value of a temperature of a part of the burner to be protected from overheating has exceeded a predetermined maximum temperature limit;
   (b) in response to a determination of the value of the temperature exceeding the predetermined maximum temperature limit, changing at least one ratio of the fuel mass flows such as to reduce the value of the temperature below the predetermined maximum temperature limit;
   (c) in response to a determination of the value of the temperature not exceeding the predetermined maximum temperature limit, determining if a value of an amplitude of pressure variations within a combustion area of the burner has exceeded a predetermined maximum pressure variations limit;
   (d) in response to a determination of the value of the amplitude of the pressure variations exceeding the predetermined maximum pressure variations limit, changing said at least one ratio such as to reduce the value of the amplitude of the pressure variations below the predetermined maximum pressure variations limit; and
   (e) in response to a determination of the value of the amplitude of the pressure variations not exceeding the predetermined maximum pressure variations limit, repeat (a) to (d) such as to maintain the values of the temperature and the amplitude of the pressure variations below their respective predetermined maximum limits.

* * * * *